United States Patent
Hansmann et al.

(10) Patent No.: US 7,404,011 B2
(45) Date of Patent: Jul. 22, 2008

(54) SYSTEM AND METHOD FOR ACCESSING DIFFERENT TYPES OF BACK END DATA STORES

(75) Inventors: Uwe Hansmann, Altdorf (DE); Stefan Hepper, Tuebingen (DE); Lothar Merk, Weil im Schonbuch (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 10/516,427

(22) PCT Filed: Apr. 4, 2003

(86) PCT No.: PCT/EP03/03529

§ 371 (c)(1),
(2), (4) Date: May 13, 2005

(87) PCT Pub. No.: WO03/102778

PCT Pub. Date: Dec. 11, 2003

(65) Prior Publication Data
US 2005/0228812 A1  Oct. 13, 2005

(30) Foreign Application Priority Data
May 31, 2002  (EP)  .................................. 02012080

(51) Int. Cl.
*G06F 15/16* (2006.01)

(52) U.S. Cl. ........................ 709/248; 709/203; 709/217; 709/219; 707/102

(58) Field of Classification Search ................. 709/204, 709/224, 217, 248
See application file for complete search history.

(56) References Cited

U.S. PATENT DOCUMENTS

| 6,341,316 | B1 * | 1/2002 | Kloba et al. ................. 709/248 |
| 6,862,617 | B1 * | 3/2005 | Wu ............................. 709/224 |
| 2002/0059375 | A1 * | 5/2002 | Pivowar et al. .............. 709/204 |
| 2003/0055825 | A1 * | 3/2003 | Chen et al. .................... 707/10 |
| 2003/0159136 | A1 * | 8/2003 | Huang et al. ................. 717/171 |
| 2007/0094345 | A1 * | 4/2007 | Rabbers et al. ............. 709/217 |

OTHER PUBLICATIONS

Butrico, M. et al. "Enterprise Data Access From Mobile Computers: An End-to-end Story", Research Issues in Data Engineering, IEEE Comput. Soc. US, pp. 9-16, Feb. 28, 2000.*

(Continued)

*Primary Examiner*—Ario Etienne
*Assistant Examiner*—Hee Soo Kim
(74) *Attorney, Agent, or Firm*—Hamilton & Terrile, LLP; Stephen A. Terrile (57) ABSTRACT

A system for exchange of data between a plurality of clients and at least one back end data store by using a central synchronization server having a connection to the clients. The clients generate data to be synchronized. The system includes a sync engine connected to the central synchronization server for performing synchronization with the central synchronization server, a single back end neutral interface associated with and connected to the sync engine, and a component assigned to each of the at least one back end data store. Each of the components include a back end dependent part having an interface with the single back end neutral interface and an interface with the assigned back end data store.

14 Claims, 6 Drawing Sheets

OTHER PUBLICATIONS

Butrico, M. et al. "Enterprise Data Access From Mobile Computers: An End-to-end Story", Research Issues in Data Engineering, IEEE Comput. Soc. US, pp. 9-16, XP010377083, ISBN: 0-7695-0531-7, Feb. 28, 2000.

Jonsson, A. et al. "SYNCML—Getting the Mobile Internet in Sync", Ericsson Review No. 3, XP001081067, ISSN: 0014-0171, pp. 110-115, 2001.

"Discussion of Synchronization Standards (Release 4)", 3GPP Arib TR-T12-27.903 V4.0.0, XP002276574, pp. 1-11, Mar. 2001.

* cited by examiner

SYSTEM AND METHOD FOR ACCESSING DIFFERENT TYPES OF BACK END DATA STORES

BACKGROUND OF THE INVENTION

1. Field of the Invention

The present invention relates to a method and system for exchange or synchronization of data between different clients, and in particular to synchronization of data between clients by using a central synchronization server linked with different types of Backend data store.

Synchronization can be defined as keeping data consistent between different clients, e.g. a Notebook calendar and Personal Digital Assistant (PDA) calendar, and storing at these clients data into different data formats with different identifiers. The synchronization data can also consist of complete computer programs or parts of these programs.

2. Description of the Related Art

Figure 1:
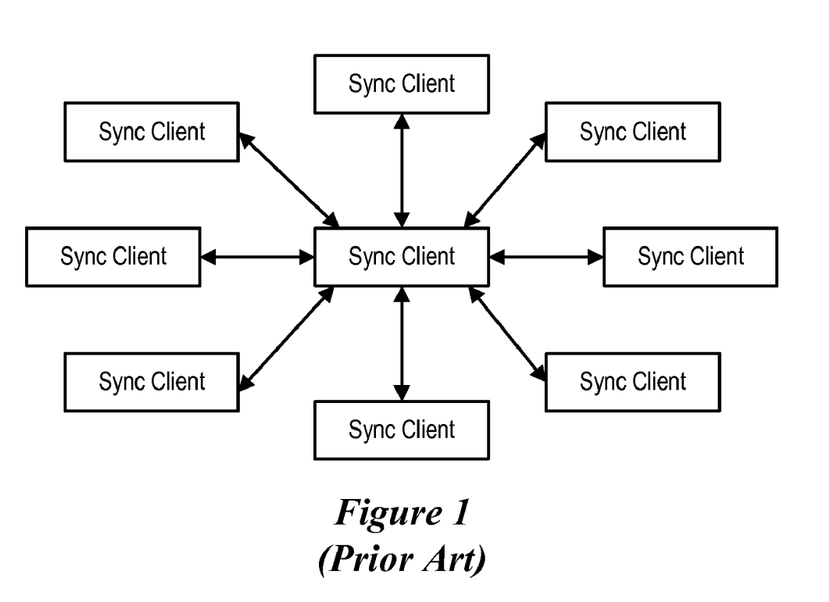
FIG. 1, labeled Prior Art, shows a simplified synchronization architecture on which the present invention may be based, FIG. 2, labeled Prior Art, shows the synchronization architecture with direct access to the Back End data store, FIG. 3, labeled Prior Art, shows the synchronization architecture with different Back End data store.
Figure 2:
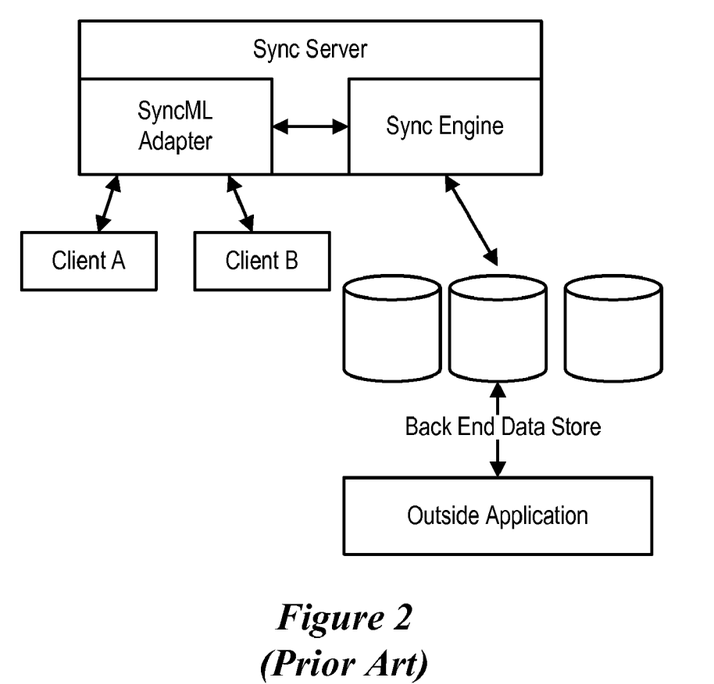

Frequently, a central synchronization server is used through which data can be exchanged between different clients (see FIG. 1). The central synchronization server can either store all data locally (i.e. when using a proprietary data format), which is normally used by carriers (e.g. Yahoo) with high loads, or can directly access Backend data stores like DB2, Domino, or Exchange (see FIG. 2).

Back End data stores have their own protocols and mechanisms to access and store information. Although relational databases use ODBC as a common interface, for instance databases storing Personal Information Management (PIM) data are usually accessed in a proprietary way and rely on very specific data structures of the content. This results in a dependency of Web-Server based applications on the specific databases and the particular types of the accessed content. It requires big efforts when adopting new databases and new types of content for an existing software.

Figure 3:
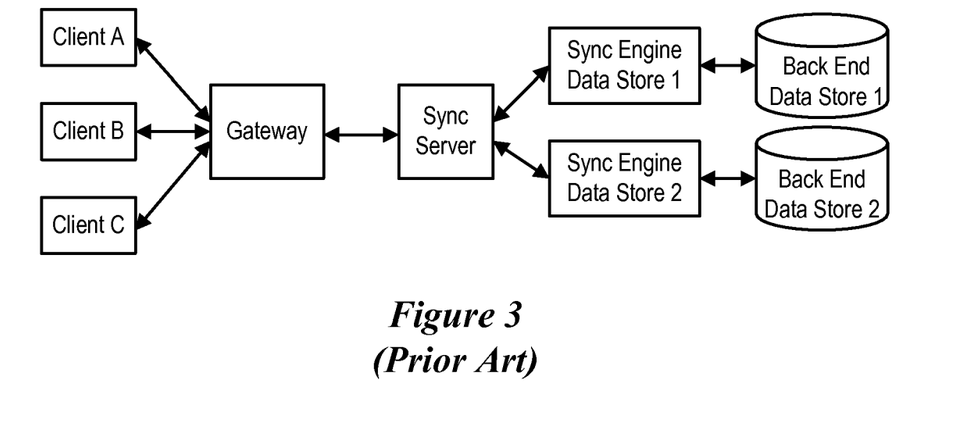

For instance, developing a big scale synchronization solution, which involves many different database manufacturers and multiple multimedia content is quite difficult under these circumstances: The synchronization engine, which includes the logic for synchronizing multiple client devices, needs to be adapted for each supported type of content and each connected database. In fact, today's synchronization engines depend strongly on the backend store, which contains the data. Significant investments for implementing a sophisticated sync engine is for the benefit of one or few backend systems only (see FIG. 3)

The same problem appears if a Notification System wants to inform a user by sending data which is collected and stored in different backend systems. Also portals which aggregate data from different systems need a system independent method to access the information.

U.S. Pat. No. 5,974,238 describes an apparatus for performing dynamic synchronization between data stored in a handheld computer and a host computer, each having a plurality of data sets including at least one common data set, each computer having a copy of the common data set. The handheld computer has a processor, a communication port, and a data synchronization engine. The data synchronization engine has a pseudo-cache and one or more tags connected to the pseudo cache. Data is synchronized whenever data is written to main memory and/or when the associated pseudo-cache tag is invalidated. By strict adherence to a set of protocols, data coherency is achieved because the system always knows who owns the data, who has a copy of the data, and who has modified the data. The data synchronization engine resolves any differences in the copies and allows the storage of identical copies of the common data set in the host computer and in the handheld computer.

This prior art patent is not directed to a synchronization architecture using a Back End data store. Therefore, the above mentioned problems related to the Back End data store are neither dealt nor solved by that patent.

It is therefore object of the present invention to provide a new method and system for exchange or synchronization of data in an architecture using a central synchronization server linked to different Back End data store types however avoiding the disadvantages of the prior art solutions.

That object is solved by the features of the independent claims. Further preferred embodiments are laid down in the dependent claims.

SUMMARY OF THE INVENTION

The present invention discloses a framework that allows a synchronization engine to synchronize data between a mobile device and Back End data stores independently from the architecture and data formats of that back-end store. The framework introduces content adapters, which access synchronization data from Back End data stores. These adapters convert the data into a Back End data store independent representation, which can be used by all applications or modules which need to access different back-ends in a generic manner. A generic synchronization engine for the purpose of conflict detection and resolution is one example for a module of this kind. Other applications that could use the content adapter are Notification Frameworks or Portals and all other applications aggregating data. Any Back End data store specific issues are handled by the Back End dependent part of the content adapters, which can easily provided by third parties and plugged into the framework.

BRIEF DESCRIPTION OF THE DRAWINGS

The present invention will be described in more detail with the accompanying drawings in which.

DETAILED DESCRIPTION

Synchronization between different clients using a central synchronization server is based on a synchronization protocol which typically consist of the following steps:

Pre-Synchronization: To prepare the actual synchronization some action must be taken before this can happen. These actions fall into the following groups: authentication, authorization, and determine client capabilities. Authentication ensures that the server is who it claims to be, and that the client is, who it claims to be. Authorization checks, whether the client is allowed to perform the requested action (e.g. delete, update, or only create new entries). Finally the server determines the device capabilities (e.g. maximum buffer size) to optimize the data flow to the client.

Synchronization: This is the part, where the synchronization data is exchanged. Between two synchronization partners all local IDs of data entries are mapped to global IDs known to both partners. Every partner therefore has a mapping table, to map local to global IDs. Then only the updated, new or deleted entries are exchanged. If both partners update the same data entry there will be a conflict. This update conflict can be resolved in different ways: try to merge the updates, duplicate the entries, let one entry win over the other, or simply do nothing and report the conflict so that the user can solve it.

Post-synchronization: At post-synchronization all the cleanup tasks are performed, like updating the mapping tables, report unresolved conflicts, and so on.

Figure 4:
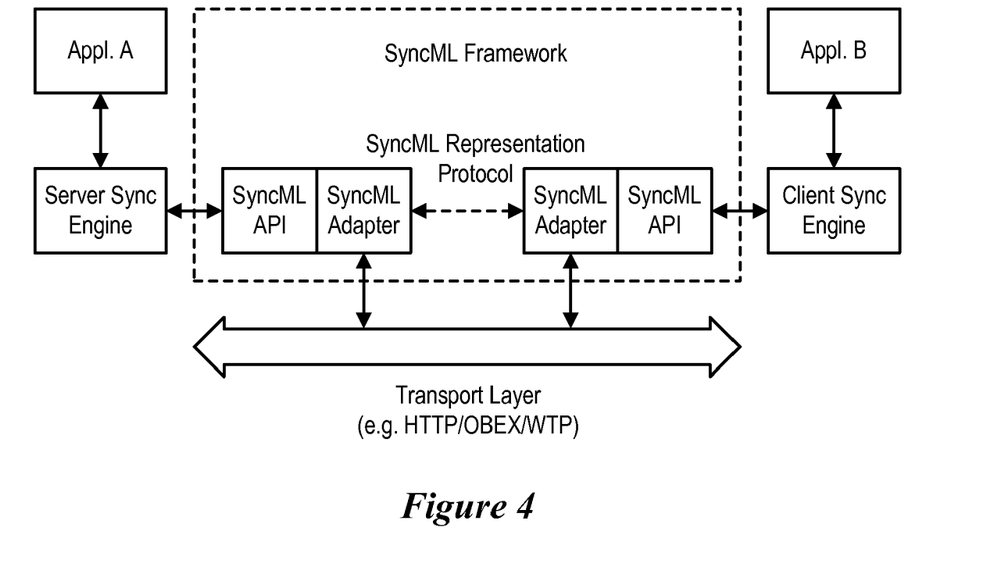
FIG. 4 shows the SyncML communication protocol which may be preferably implemented by the present invention.

A widely used synchronization protocol is SyncML. SyncML provides an XML-based transport protocol for synchronization that is independent of the transport protocol. Each synchronization Message is a XML-document. A typical SyncML system is shown in FIG. 4 where Application B (e.g. Personal Digital Assistant) is sending synchronization data via its Client Sync Engine to the SyncML Framework. The SyncML Framework translates the API calls (e.g. Update, Create) and the data into a valid SyncML document and sends it to the Server. On the Server side the SyncML Framework receives the document, parses it, and then sends the command and data to the Server Sync Engine, which then talks to the Application A (e.g. Lotus Notes Calendar of a notebook).

Figure 5:
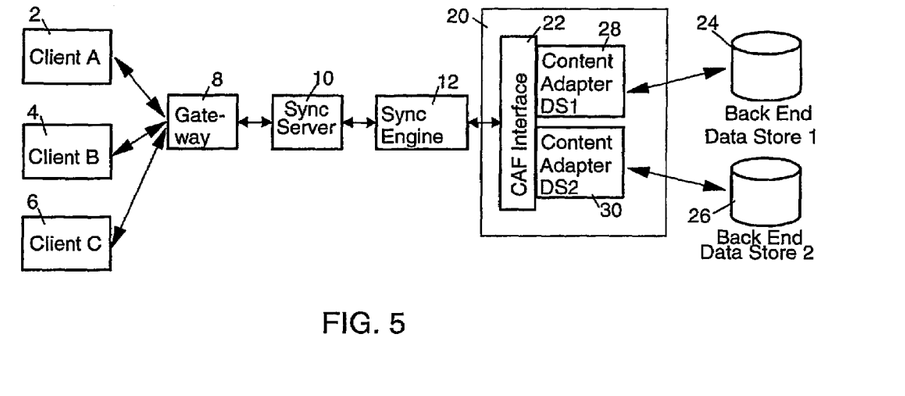
FIG. 5 shows the basic architecture of the inventive content adapter framework (CAF)

FIG. 5 shows the basic architecture of the inventive content adapter framework (CAF) used in a communication architecture between mobile clients and different Back End data store types.

The different mobile Clients 2,4,6 access the Sync Engine 12 via a wireless or wired gateway 8 and through a Web Server 10 and the Sync Engine 12 talks via CAF 20 to the different Back End data store types 24,26. The CAF 20 provides the infrastructure to access data of different Back End data stores 24,26 through a single backend neutral interface (CAF-interface 22) and to easily add new Back End data stores. The CAF 20 consists of at least a single CAF-interface 22 and one or more content adapters 28,30.

The CAF-interface 22 represents a single interface for the Sync Server 10 to access Back End data and therefore separates the content retrieval from the Sync Server. Through the CAF-interface 22 a Sync Engine 12 is able to access content independently from a specific Back End data store 24,26. For the data exchange between CAF-interface 22 and Sync Server 10 preferably Data Objects are used as data format.

Basically the content adapter provides all data store specific dependencies.

In preferred embodiment of the present invention each content adapter 28,30 includes an abstract Back End independent part and a Back End dependent part. The Back End dependent part contains all data store specific dependencies. It implements access to the synchronized Back End data and creates a data store independent representation of that data, which is provided to the Sync Engine 12 or application layer using the CAF interface 22. The CAF specific process flow is managed by the Back End independent part of the content adapter 28,30. Back End independent part provides the functionality common to all Back End data stores, e.g. queuing mechanism, communication handling.

In order to include semantic information, which can be used by the application (e.g. sync engine), a class hierarchy of common data objects is defined: Special subclasses of data objects describe the typical properties of the supported types of data, e.g. address, calendar, multimedia information, relational data bases, etc. The properties describing a data object for a particular kind of information can be taken from common standards, such as vCard (standard format for exchanging business card information) for address book information or vCal (standard format for exchanging calendar information) for calendar entries. Applying XML allows even representing customer specific databases independent from a particular database.

Figure 6:
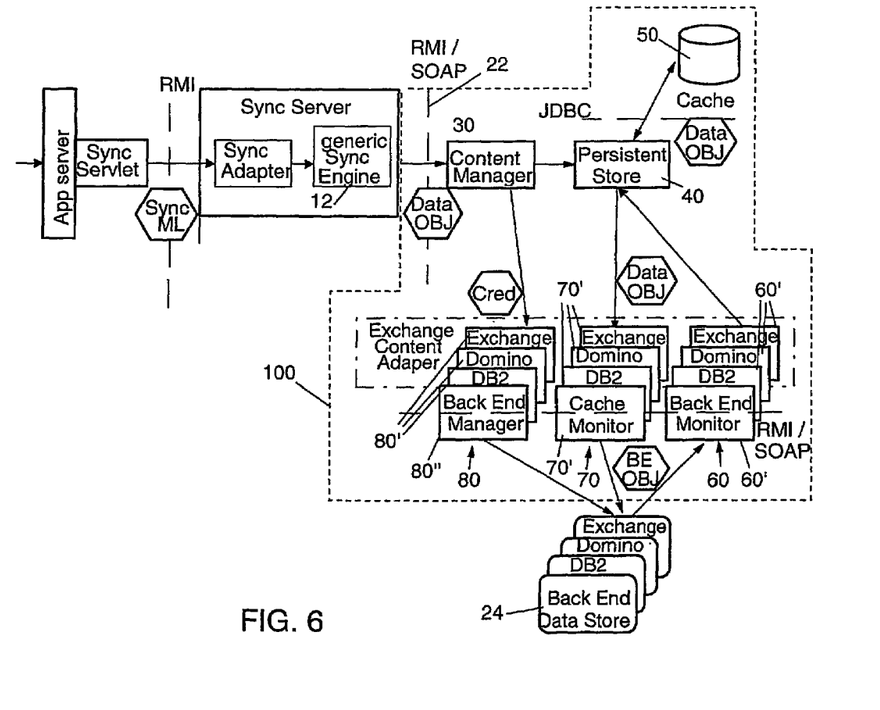
FIG. 6 shows a preferred implementation of the CAF.

Finally the framework 20 provides the infrastructure to easily integrate a caching mechanism between the Sync Engine 12 and the Back End data stores 24,26 for high volume systems or slow back-end systems (see FIG. 6)

The content adapter provide fast read/write access, adaptable to different backend systems (e.g. Domino, DB2, Exchange), support multiple SyncML messages, always have consistent data, and adaptable to different content formats.

The method carried out by the basic architecture of CAF may be briefly summarized as follows: Client requests sync session with Sync Server. Server authenticates client and accepts sync session. Client sends update to server. Sync server creates data objects and fills in the update received from the client. Sync server calls then CAF interface and hands over data objects. CAF selects the appropriate Back End specific part of the content adapter.

CAF calls the Back End specific part and passes the data objects to it. Back End specific part of the content adapter transforms data objects in a Back End specific format and calls Back End specific API (application programming interface).

One of the main advantages of the present invention compared with the prior art is making the access specific back-end databases independent from the calling application. CAF integrates components from different database providers and offers access to their database functionality through a high-level interface.

By using common interfaces, the content adapters ensure interoperability of application with multiple Back End systems. A Sync Engine, for example, does not depend on proprietary commands of a particular database. Additionally, the components hide the complexity of the content, which is exchanged between a database and an application. This significantly reduces the programming efforts and the complexity of solutions. Also CAF allows the backend end system provider to just develop one interface for different applications accessing that backend data store. This saves both parties (the application provider and the backend supplier) a hugh amount of time and money.

CAF allows:
  sync engines to talk to different back-end systems using the same protocol and API
  back-end system providers to create their own content adapter tailored towards their back-end system
  provides a session between sync engine, CAF and the back-end system handling the authentication to re-use back-end connections for efficiency
  allows the usage of a caching system to achieve low latency time for the communication sync engine—CAF
  allows for load-balancing and fail-save distribution of components FIG. 6 shows a preferred implementation of the CAF. The CAF 100 comprises a CAF-interface 22, a Content Manager 30, and a caching mechanism.

The CAF interface 22 provides a single interface for the Sync Server to access Back End data stores 24 and therefore separates the content retrieval from the Sync Server 10.

The Content Manager 30 forwards authentication and backend management requests (e.g. get a sync anchor) to the Back End Manager 80, writes new data to the cache 50 using the Persistent Store 40, and gets updates from the cache 50 through the Persistent Store 40. Search and execute commands are performed on the Back End.

The caching mechanism provides a permanent cache 50 and a mechanism for buffering of updates into the cache 50 and synchronizing buffered updates with the respective clients. The permanent cache 50 may be a relational data base like Oracle or IBM DB2 and may be accessed for example via JDBC calls. The caching mechanism preferably consists of a Cache Monitor 70, a Backend Monitor 60, a Back End Manager 80, and a persistent store 40. The Backend End Manger 80 includes an abstract Backend End Manager 80" with its Back End specific parts 80' (Content Adapter), the Cache Monitor 70 includes an abstract Cache Monitor 70" with its Back End specific Cache Monitor parts 70' (Content Adapter), and the Backend Monitor 60 includes an abstract Backend Monitor 60" with its Back End specific Backend Monitor parts 60"(Content Adapter).

The Cache Monitor 70 is primarily used to replicate all new data from the cache to the back end data store. Depending on the Back End requirements different replication strategies, such as batch or trickle may be adopted. If the primary objective is to better support sync clients instead of regular back end clients the batch mode is preferred. The Back End dependent part 70' of the Cache Monitor 70 is specific for each Back End data store and must exploit the features of the Back End data store (e.g. DB2, Domino). It also translates Sync Objects into a content storage specific format (e.g. Lotus Domino or MS Exchange).

The Back End Monitor 60 trickles updates that occur in the Back End data store 24 from outside the sync server (e.g. a regular Lotus Notes client updating a database) into the cache 50. This allows sync Clients to synchronize always with the latest back end data without requiring the overhead of a full replication for each sync session. The Back End specific part 60' of the Back End Monitor 60 is specific for each Back End data store and translates the content storage specific format (e.g. Lotus Domino or MS Exchange) into CAF Sync Objects.

The Back End Monitor can have different update policies, including aggressive or lazy updates, to optimize the overall system performance.

The Back End Manager 80 provides access to administrative functionality of the Back End data store. The following functionality preferably offered for supporting the CAF: validation of user authentication, retrieval of access permissions for authenticated users, retrieval of the current back end specific timestamp (current "sync anchor"), and adding/removing the URIs CAF wants to monitor for changes. The Back End specific part 80' of the Back End Manager 80 is specific for each Back End data store and translates the content storage specific format (e.g. Lotus Domino or MS Exchange) into CAF Sync Objects.

The data to be synchronized can either be stored directly in the remote content store (backend) or can be cached persistently on the server (locally) for performance reasons. The Persistent Store 40 uses a persistent storage medium as a cache to optimize read/write access to the Back End data store, however, the architecture does not prevent that the Persistent Store directly connects to the backend data store via the Cache 50 and Back End Monitor.

The communication flow within above CAF implementation may be briefly summarized as follows:

The Content Manager 30 receives the requests from the Sync Engine 12 and forwards them either to the persistent store 40, if data needs to be retrieved or stored, or to the Back End Manager 80, if a timestamp is needed or authentication is requested. The Back End Registry, if available, contains all available Back End Managers 80 and Monitors 60,70 and is accessed from Content Manager 30 and Persistent Store 40. The Cache Monitor 70 gets updated data from the Persistent Store 40, translates these to the Back End format, and forwards the data to the Back End data store 24 by using the Back End dependent part 70' of the Cache Monitor. The Back End dependent part 60' of the Back End Monitor 60 receives the updates from the Back End data store 24, translates them to Data Objects, and forwards them to the Persistent Store 40.

In case the cache is not available or for a given database a direct access to the Back End 24 is specified, the Content Manager 30 forwards the getUpdates call to the Back End Monitor 60 and the items to be updated to the Cache Monitor 70. Both monitors will use the provided user ID and password to access the backend.

Authentication Sync Engine with CAF

The sync engine has two options for authentication its requests to CAF 1. provide for each command the required backend user ID and password
2. request an authentication token from CAF for one backend by providing a user ID and a password. Each subsequent command to CAF for this sync session can be authenticate with this token (similar to a LTPA token). The following token types may be supported: read-only access, read/write access, or unrestricted read access, but write must be authenticated each time at the Back End.

Authentication CAF to Back End Data Store

The required authentication level to the Back End data store is stored in Access Control Lists for each Back End data store and checked by the Sync Adapter. Dependent on this list, CAF authenticates itself to the Back End data store either with a group user and group password valid for all user that update their data through the sync server or on a per user basis.

Figure 7:
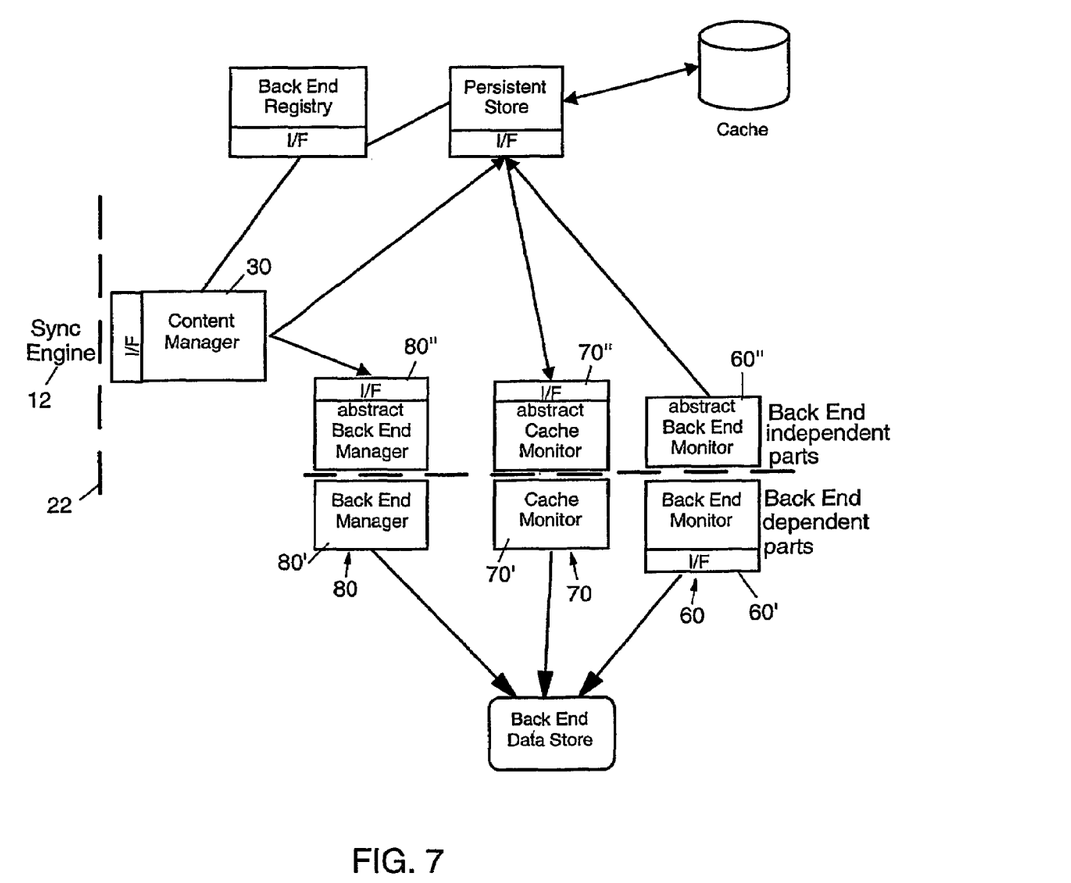
FIG. 7 shows the CAF interfaces.

FIG. 7 shows the interfaces (I/F) of the CAF in the preferred implementation of FIG. 6.

The Sync Engine 12 uses the CAF interface 22 to access the Back End data stores in a generic way. To efficiently exchange data between generic Sync Engine 12 and CAF interface 22, CAF interface 22 preferably uses the raw value binary encoding scheme for data exchange. These raw data are embedded as ActionData object in the Syncobj together with the CAF Meta data.

CAF Meta data are:

Timestamp represents the current sync anchor of the SyncObj. It is stored as object of the class java.sql.Timestamp.

ActionType represents the data action type of the SyncObj. Possible values are defined in class constants (CREATE, UPDATE, DELETE). It is stored as short value.

GUID represents the backend specific global id of the SyncObj. It is stored as java.lang.String value.

CUID represents the CAF specific cache id of the Syncobj. It is stored as java.lang.String value.

databaseURI represents the URI of the backend database to which the SyncObj belongs to. It is stored as object of the class com.ibm.caf.URI.

userID represents the user id of the client that initiated the synchronization to which the Syncobj belongs to. It is stored as java.lang.String value.

The Interfaces of the CAF Specific Process Flow

The Abstract Monitor Class offers basic functionality for the integration of Back End specific Monitors into the CAF architecture. Two abstract classes called Abstract Cache Monitor and Abstract Backend Monitor are provided that can be used via inheritance for the creation of new Monitor classes (see FIG. 8).

The abstract classes provide the following functionality:
Queuing mechanisms for different update policies (trickle/batch updates)
Registration/Deregistration at the Backend Registry
Reading and registration for updates at the System Preferences Component
Handling of communication with CAF Persistent Store (Cache)

Figure 9:
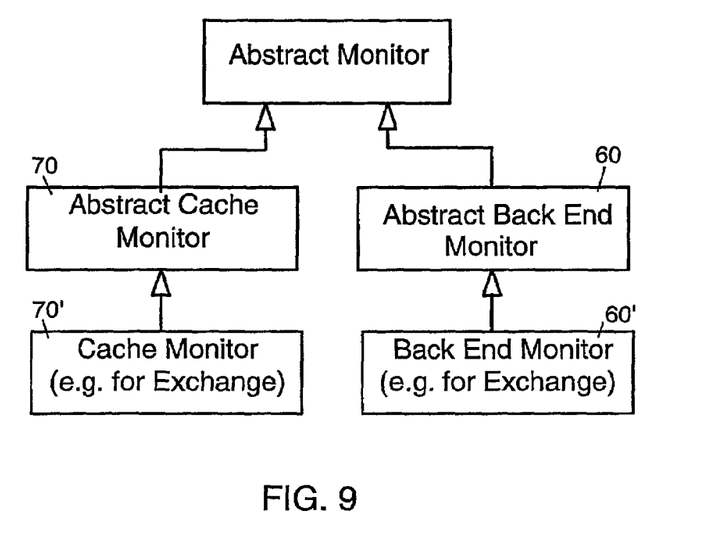
FIG. 9 shows the inheritance model as used by the CAF.
Figure 10:
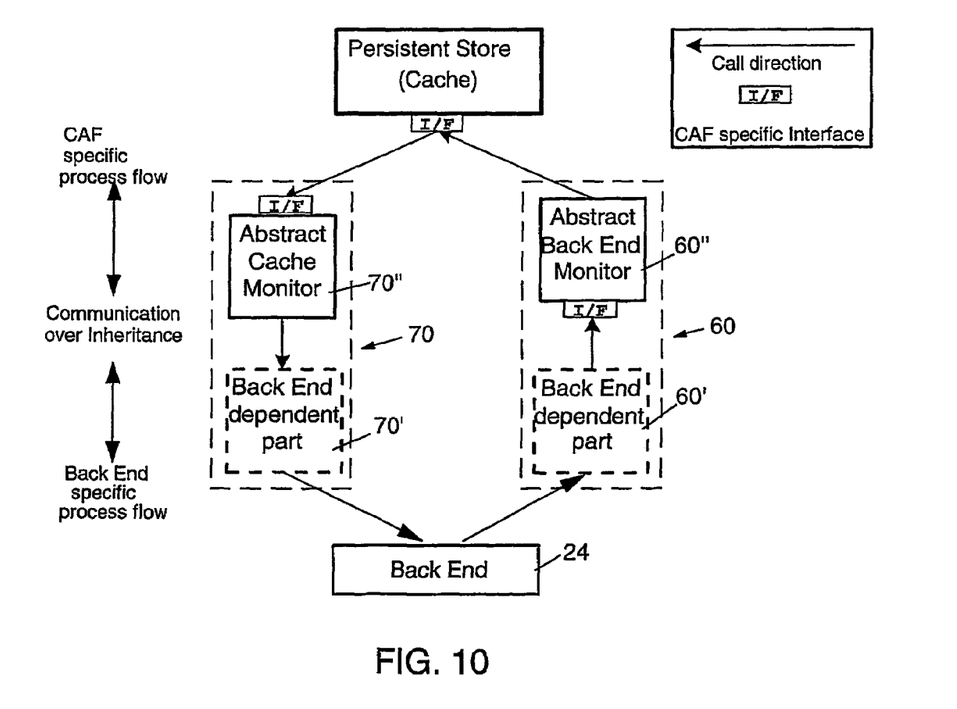
FIG. 10 shows the CAF specific process flow.

The CAF specific process flow is managed by the Abstract Backend Monitor 60 and the Abstract Cache Monitor 70 through the interfaces defined in this patent application. The direct communication with the Back End data store 24 is implemented in Back End specific components 70', 60' that are inherited from the Abstract Monitor classes (see FIG. 9)

Each Monitor implements an internal queue that enables different update and data propagation policies. Dependent on the usage scenario, it may be necessary to send updated data in groups to the backend, or in large time intervals.

The Abstract Monitor component implements a configurable queuing mechanism that offers the following update policies:

Amount Trigger:

The Amount Trigger monitors the size of the internal queue. It will propagate the collected items when a certain configurable threshold is reached. This update policy can be used for configuring a batch (threshold>1 item) or trickle (threshold=1 item) update mechanism in the specific monitor.

Interval Trigger:

The Interval Trigger monitors the time that has been passed since the last time of propagation. It will send the collected items when a certain configurable time interval is reached.

Combined Trigger:

The Combined Trigger utilizes both above-mentioned policies: It will propagate the collected items whenever one of the triggers is activated.

Session Handling

The topic of session handling applies primarily to the Cache Monitor, which is part of the overall CAF processing. Session handling in the Backend Monitor is completely dependent on the backend-specific implementation.

There are two different usage patterns for the Cache Monitor: with and without the CAF Cache. When the Cache is used, no session handling is supported at all. The updates are replicated asynchronously from the cache to the backend. Since access to the backend database is performed through a admin-like user account, pooling of connections is possible for all occurring updates.

In the case that no cache is used, session handling is performed with the methods beginConnect( ) and endConnect( ).

All updates are grouped on a "per user" basis, which allows connection pooling for each synchronizing user with the given credentials.

Figure 8:
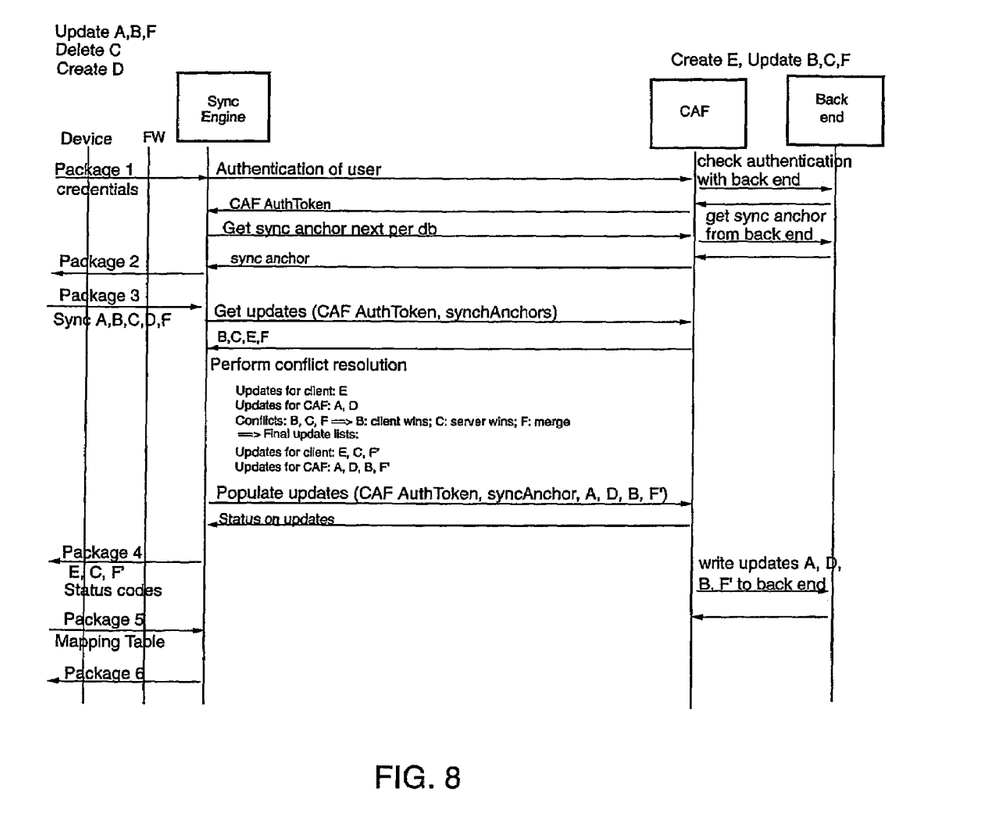
FIG. 8 shows a communication flow between client, sync engine, CAF and backend-system with session authentication.

FIG. 8 shows a synchronization flow for a two-way synchronization with session authentication preferably applied by the inventive CAF.

A two-way synchronization between Client and Server is performed where the Client as updated item A,B and F, deleted C and created a new item D. Via an external client (e.g. Notes client) E was created on the Back End and B, C and F were updated.

Package 1 from client sends the credential for the Back End data store. The Sync Engine forwards these credentials to the CAF for verification. CAF asks the responsible Back End to verify the credentials and returns an authentication token valid for a synchronization session to the Sync Engine. This token needs to be included into any future request to the CAF for this synchronization session.

In package 3 the clients sends its updates to the Sync server. The Sync Engine requests the Back End updates from the CAF by presenting the authentication token. Now the Sync Engine compares the lists, resolves the conflicts, and populates the updated entries to the CAF and client. CAF stores these updates in its cache and replicate these changes later to the Back End system.

The Sync Engine without interaction of CAF does the handling of package 5 with mapping table information.

What is claimed is:

1. A system for exchange of data between a plurality of clients and at least one back end data store by using a central synchronization server having a connection to said clients, said clients generating data to be synchronized, said system comprising:
   a sync engine for performing synchronization with said central synchronization server and connected to said central synchronization server;
   a single back end neutral interface associated with and connected to said sync engine; and
   a component assigned to each of said at least one back end data store, each of said components comprising a back end dependent part having an interface with said single back end neutral interface and an interface with said assigned back end data store, each of said components further comprising an abstract Back End independent part, wherein said abstract Back End independent part provides common functionalities for use by all the Back End dependent parts; and,
   a cache for permanently buffering of updates of said at least one back end data store and said clients, and wherein
   each component comprises a caching mechanism for controlling and executing buffering updates into said cache and replicating buffered updates to said respective clients and said assigned back end data store, said caching mechanism having a Back End Monitor; and,
   said caching mechanism provides for each of said at least one back end data store its own Back End Monitor, Cache Monitor, and Back End Manager with its Back End dependent part and its abstract Back End independent part.

2. A system according to claim 1, wherein each of said components further comprises an abstract Back End independent part, wherein said abstract Back End independent part provides common functionalities for use by all the Back End dependent parts.

3. A system according to claim 2, wherein each of said at least one back end data store is assigned its own said component.

4. A system according to claim 2, further comprising a cache for permanently buffering of updates of said at least one back end data store and said clients, and each said component comprises a caching mechanism for controlling and executing buffering updates into said cache and replicating buffered updates to said respective clients and said assigned back end data store.

5. A system according to claim 4, wherein said caching mechanism has a Back End Monitor.

6. A system according to claim 5, wherein said caching mechanism further includes a Back End Manager.

7. A system according to claim 5, wherein said Back End Monitor replicates updates between said cache and the associated one of said at least one back end data store in a batch or a continuous trickle mode.

8. A system according to claim 4, wherein said caching mechanism includes a Cache Monitor.

9. A system according to claim 8, wherein said Cache Monitor replicates updates from said cache to the associated one of said at least one back end data store in a batch or a continuous trickle mode.

10. A system according to claim 4, wherein said caching mechanism further comprises a persistent store.

11. A system according to claim 4, wherein said cache and said at least one back end data store are databases.

12. A system according to claim 1, wherein said exchange of data is synchronization of data.

13. A system according to claim 12, wherein SyncML is employed as a synchronization protocol.

14. A system according to claim 1, wherein said clients are mobile clients.

* * * * *